United States Patent
Suzuki

(10) Patent No.: US 10,254,490 B2
(45) Date of Patent: Apr. 9, 2019

(54) OPTICAL MODULE AND MANUFACTURING METHOD THEREOF

(71) Applicant: Oclaro Japan, Inc., Sagamihara, Kanagawa (JP)

(72) Inventor: Takanori Suzuki, Tokyo (JP)

(73) Assignee: Oclaro Japan, Inc., Kanagawa (JP)

(*) Notice: Subject to any disclaimer, the term of this patent is extended or adjusted under 35 U.S.C. 154(b) by 0 days.

(21) Appl. No.: 15/830,016

(22) Filed: Dec. 4, 2017

(65) Prior Publication Data
US 2018/0164517 A1 Jun. 14, 2018

(30) Foreign Application Priority Data
Dec. 13, 2016 (JP) ................. 2016-241061

(51) Int. Cl.
*G02B 6/26* (2006.01)
*G02B 6/42* (2006.01)

(52) U.S. Cl.
CPC ........... *G02B 6/4239* (2013.01); *G02B 6/42* (2013.01); *G02B 6/425* (2013.01); *G02B 6/4214* (2013.01); *G02B 6/4226* (2013.01); *G02B 6/4227* (2013.01); *G02B 6/4244* (2013.01); *G02B 6/4257* (2013.01)

(58) Field of Classification Search
CPC ........ G02B 6/32; G02B 6/423; G02B 6/4249; G02B 6/4204; G02B 6/4225; G02B 6/26
See application file for complete search history.

(56) References Cited

U.S. PATENT DOCUMENTS

| 7,136,554 B1 | 11/2006 | Stevens |
| 2003/0215186 A1 | 11/2003 | Wood et al. |
| 2004/0114942 A1 | 6/2004 | Yee et al. |

(Continued)

FOREIGN PATENT DOCUMENTS

| JP | 2004-310029 A | 11/2004 |
| JP | 2005-227553 A | 8/2005 |

(Continued)

OTHER PUBLICATIONS

United States Final Office Action mailed in corresponding U.S. Appl. No. 15/351,479 dated Jan. 17, 2018.

(Continued)

*Primary Examiner* — Jennifer Doan
(74) *Attorney, Agent, or Firm* — Mattingly & Malur, PC

(57) ABSTRACT

In an optical module including an optical axis adjustment mechanism, the reliability of fixation of a movable portion is enhanced while an adhesive is prevented from flowing out to an unintended portion. An optical module includes an element portion, a manipulation lever, a bank, a support spring, and a reservoir portion. The bank includes a lever-opposing portion having a step face facing a longitudinal side face of the manipulation lever. The support spring is connected at both ends to the element portion and the bank. The reservoir portion is surrounded in a bay shape, in a plan view, by the manipulation lever, the element portion, the support spring, and the bank and stores the adhesive fixing the lever to the substrate. The reservoir portion includes, in the vicinity of a handle of the manipulation lever, an outflow blocking portion blocking the outflow of the adhesive before curing.

9 Claims, 14 Drawing Sheets

(56) References Cited

U.S. PATENT DOCUMENTS

| | | |
|---|---|---|
| 2006/0222291 A1 | 10/2006 | Yoshida |
| 2012/0195551 A1 | 8/2012 | Pezeshki et al. |
| 2014/0064675 A1* | 3/2014 | Tanaka .................... G02B 6/42 |
| | | 385/89 |
| 2018/0003921 A1* | 1/2018 | Chen ........................ H02N 2/06 |

FOREIGN PATENT DOCUMENTS

| | | |
|---|---|---|
| JP | 2012-517028 A | 7/2012 |
| JP | 2014-86467 A | 5/2014 |
| WO | 2010/088631 A2 | 8/2010 |

OTHER PUBLICATIONS

Japanese Office Action received in corresponding Japanese Application No. 2014-251110 dated May 8, 2018 and partial translation thereof.
United States Non-Final Office Action received in corresponding U.S. Appl. No. 16/140,815 dated Jan. 11, 2019.
Japanese Office Action received in corresponding Japanese Application No. 2015-225718 dated Jan. 22, 2019.

* cited by examiner

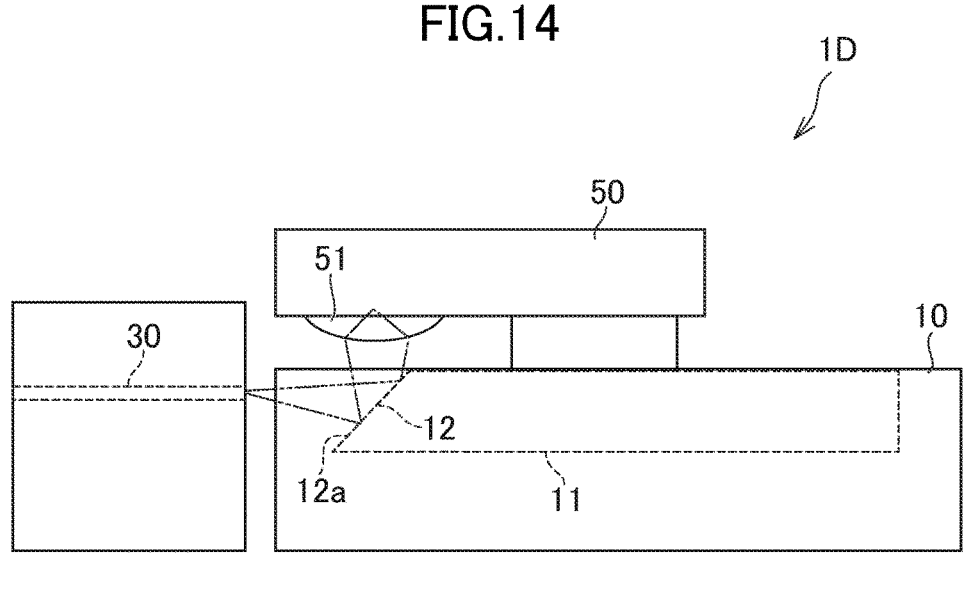
FIG.14
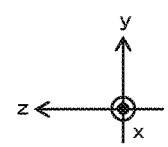

OPTICAL MODULE AND MANUFACTURING METHOD THEREOF

CROSS-REFERENCE TO RELATED APPLICATION

The present application claims priority from Japanese application JP2016-241061 filed on Dec. 13, 2016, the content of which is hereby incorporated by reference into this application.

BACKGROUND OF THE INVENTION

1. Field of the Invention

The present invention relates to an optical module and a manufacturing method of an optical module.

2. Description of the Related Art

For improving the transmission speed and transmission capacity of optical communications, a technique for parallel transmission of a plurality of optical signals or a technique for bundling a plurality of optical signals into one optical signal and transmitting the signal has been studied. An optical module that performs such optical transmission includes optical axis adjustment mechanisms to individually adjust the optical axes of the optical signals in some cases. JP 2012-517028 A discloses an optical assembly including a movable lever that holds a lens to focus light of a first waveguide into a second waveguide. After the lever is manipulated to adjust the position of the lens, the lever is fixed by solder or the like to fix the lens position. For example, solder and an electrode are previously disposed in the vicinity of the lever, a current is fed to the electrode to melt the solder, and thus, the solder adheres to the lever and fixes the lever.

SUMMARY OF THE INVENTION

When the solder or the electrode is previously provided in the optical module for fixing a movable portion of the optical axis adjustment mechanism, such as the lever or the lens, the structure of the optical module is complicated, thus resulting in disadvantage for miniaturization.

Moreover, in a method in which a manipulation to determine the position of the lever is previously performed and then an adhesive is attached to the movable portion and cured, work for maintaining the position of the lever and injection work of the adhesive are simultaneously performed. Therefore, work may become difficult, or a complicated apparatus may be required for the work.

In contrast to this, in a method in which an adhesive is previously attached to the movable portion and then the manipulation of the lever and the curing of the adhesive are performed, the injection work of the adhesive and the manipulation of the lever can be separately performed, and therefore, work or an apparatus can be simplified. On the other hand, when the lever is manipulated, the adhesion state of the adhesive having fluidity to the movable portion may be changed according to the moving direction or moving amount of the movable portion such as the lever. Therefore, fluctuations occur in the fixed state of the movable portion, and thus the fixation may be insufficient in some cases. Moreover, the adhesive may flow out or adhere to an unintended portion. On the other hand, it is not necessarily easy to control the amount or application area of the adhesive so as not to cause such a trouble.

It is therefore an object of the invention to provide a structure, in an optical module including an optical axis adjustment mechanism, for enhancing the reliability of fixation of a movable portion of the optical axis adjustment mechanism while preventing an adhesive previously poured around the movable portion from flowing out to an unintended portion, and a manufacturing method of the optical module.

(1) An optical module according to the invention includes: an element portion including an optical element optically coupling first and second optical transmission paths, the element portion being disposed on a surface of a substrate; a manipulation lever connected at one end to the element portion and extended on the substrate surface, the manipulation lever being manipulated when moving the element portion on the substrate surface; a bank being a projected portion raised from the substrate surface, the bank including a lever-opposing portion including a step face facing a longitudinal side face of the manipulation lever; a support spring connected at both ends to the element portion and the bank and supporting the element portion; a reservoir portion being a depressed portion on the substrate, the reservoir portion being surrounded in a bay shape, in a plan view, by the manipulation lever, the element portion, the support spring, and the bank from a connection point with the support spring to the lever-opposing portion; and an adhesive stored in the reservoir portion and fixing the manipulation lever to the substrate, wherein the reservoir portion includes, in the vicinity of the other end of the manipulation lever, an outflow blocking portion blocking the outflow of the adhesive before curing.

(2) In the optical module according to (1), the outflow blocking portion may be a portion of the bank and may be a projected portion projecting from the lever-opposing portion toward the other end of the manipulation lever in a plan view.

(3) In the optical module according to (2), a distance from the other end of the manipulation lever to the projected portion of the outflow blocking portion may be smaller than a distance from a portion of the manipulation lever other than the other end to the lever-opposing portion.

(4) In the optical module according to (1), the outflow blocking portion may be formed at an opening of the bay shape and may be a substrate surface having low wettability with respect to the adhesive compared to an inner region recessed into the bay shape from the opening.

(5) In the optical module according to (1) to (4), the manipulation lever or the bank may include depressions and projections on a side face facing the reservoir portion.

(6) In the optical module according to (1) to (5), a plurality of the element portions may be arranged on the substrate, and the manipulation lever, the support spring, and the reservoir portion may be provided for each of the element portions.

(7) In the optical module according to (1) to (6), the substrate may be a silicon substrate in which an insulating layer and a surface silicon layer are stacked in order on a surface of the substrate, and the element portion, the manipulation lever, the support spring, and the bank may be integrally formed in the surface silicon layer.

(8) In the optical module according to (1) to (7), the adhesive may be a UV curable resin or solder.

(9) A manufacturing method of the optical module according to (1) to (8), includes: a step of forming the element portion, the manipulation lever, the support spring, the bank, and the reservoir portion on the substrate; an adhesive disposing step of disposing the adhesive in the reservoir portion; an adjustment step of moving the manipulation lever to adjust the position or direction of the element portion after the adhesive disposing step; and a step of curing the adhesive to fix the element portion, the manipulation lever, and the support spring to the substrate after the adjustment step.

According to the invention, the optical module in which the reliability of fixation of the movable portion is improved while the outflow of the adhesive to an unintended portion is prevented is obtained.

BRIEF DESCRIPTION OF THE DRAWINGS

FIG. 14 is a schematic side view of an optical module according to a fourth embodiment of the invention.

DETAILED DESCRIPTION OF THE INVENTION

Figure 1:
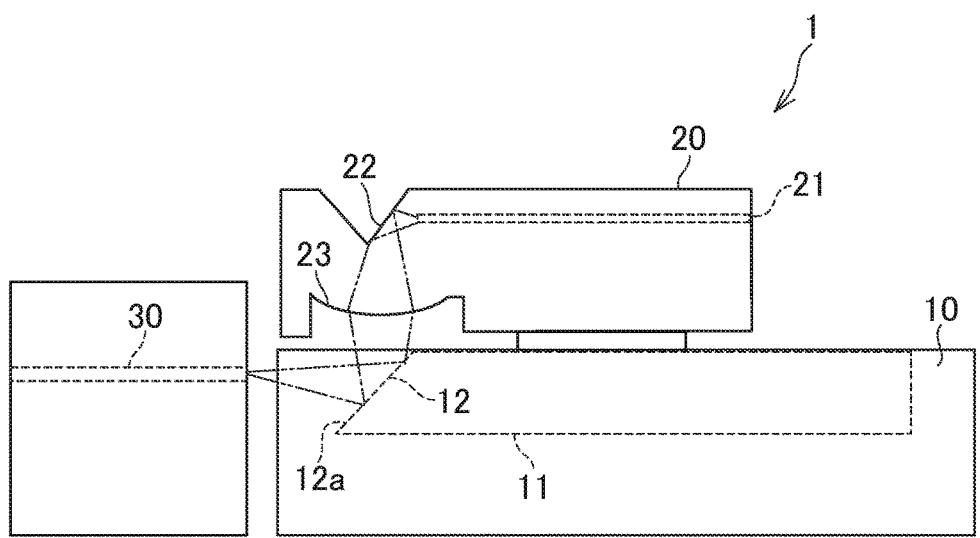
FIG. 1 is a schematic side view of an optical module according to a first embodiment of the invention.
Figure 1:
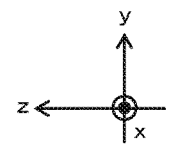

Hereinafter, embodiments of the invention will be described based on the drawings. Throughout the drawings for illustrating the embodiments, members having the same function are denoted by the same reference numerals and signs, and the repetitive description thereof is omitted. The drawings shown below are used to illustrate examples of the embodiments, in which the sizes of the drawings do not necessarily match the scales described in the examples.

First Embodiment

FIG. 1 is a schematic side view of an optical module 1 according to a first embodiment of the invention. FIG. 1 represents a y-z plane, in which the x-axis is an axis penetrating the paper surface and directed to the front. The optical module 1 includes an array-type semiconductor laser device 20, a silicon-on-insulator (SOI) substrate 10, and an optical waveguide 30. The transmission path of light emitted by the array-type semiconductor laser device 20 and the optical waveguide 30 are optically coupled by an optical element provided in the SOI substrate 10. Instead of the array-type semiconductor laser device, a plurality of disposed individual semiconductor lasers can also be used as semiconductor laser devices.

Figure 2:
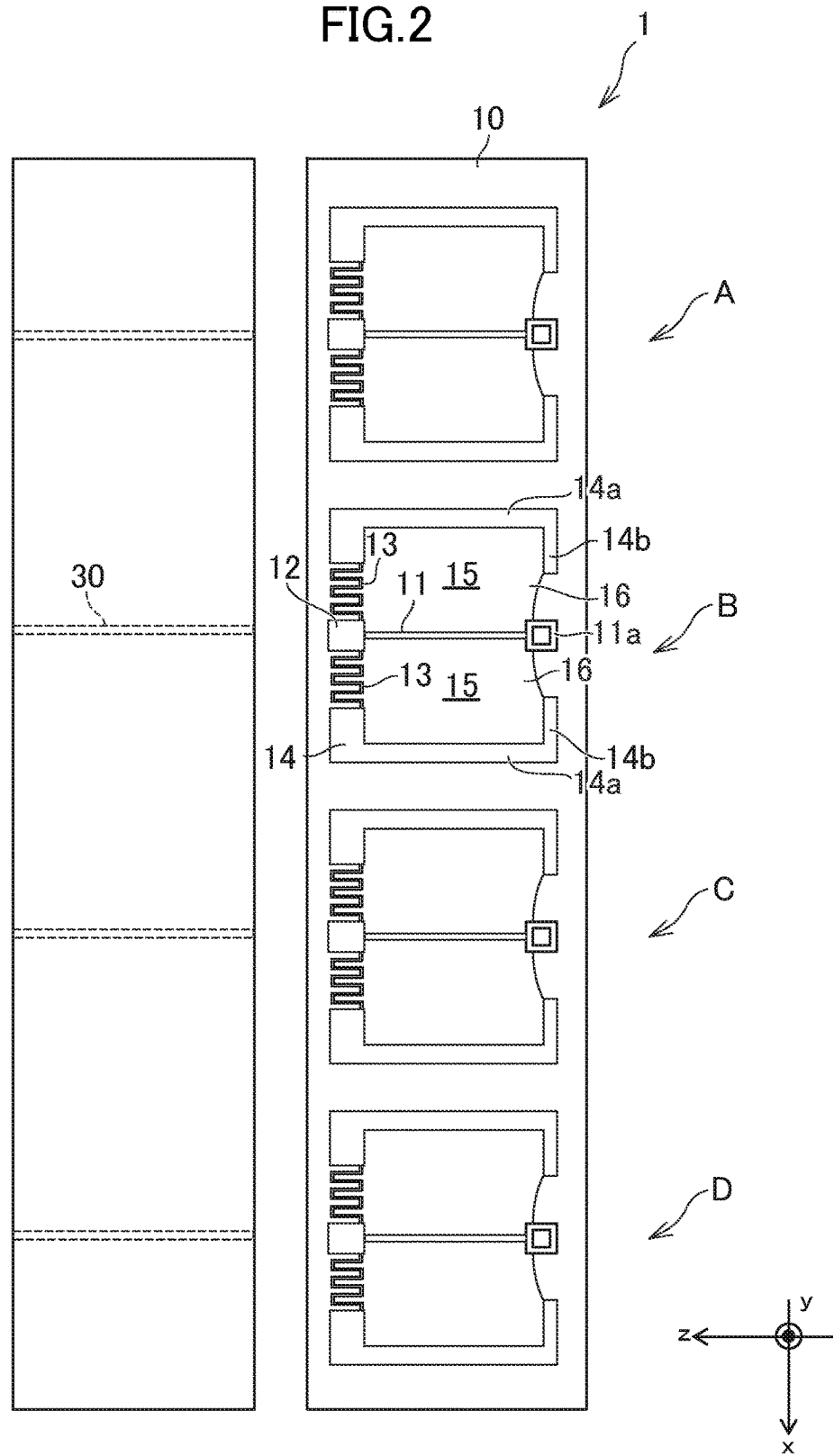
FIG. 2 is a schematic top view of the optical module according to the first embodiment of the invention.

FIG. 2 is a schematic top view of the optical module 1. FIG. 2 represents an x-z plane, in which the y-axis is an axis penetrating the paper surface and directed to the front. In the embodiment, an optical module that is used for parallel transmission of four optical signals is exemplified as the optical module 1. In FIG. 2, the array-type semiconductor laser device 20 is omitted for the sake of convenience of illustration. However, the array-type semi conductor laser device 20 is a photonic device that emits a plurality of light beams, and four laser devices each of which generates laser light are arranged in the x-axis direction in the embodiment. Moreover, four optical waveguides 30 to which the four laser lights from the array-type semiconductor laser device 20 are input is shown in FIG. 2. For adjusting the optical axis of each of the laser lights with respect to the optical waveguide 30, a first optical axis adjustment mechanism A, a second optical axis adjustment mechanism B, a third optical axis adjustment mechanism C, and a fourth optical axis adjustment mechanism D are arranged as optical axis adjustment mechanisms each including a manipulation lever 11, an element portion 12, and support springs 13, in the SOI substrate 10. The pluralities of laser devices and optical waveguides are formed in an array as described above, so that the optical module 1 can be miniaturized. In the optical module 1 according to the embodiment, an array gap (e.g., a gap in the x-axis direction between the laser light incident on the first optical axis adjustment mechanism A and the laser light incident on the second optical axis adjustment mechanism B) is 250 µm.

As previously described, the array-type semiconductor laser device 20 is a photonic device that emits a plurality of light beams, and specifically, four laser devices each of which generates laser light are arranged in the x-axis direction. The array-type semiconductor laser device 20 includes an optical resonator 21 that oscillates laser light, a mirror surface 22 that downwardly reflects the laser light, and a lens 23 that converges the laser light. Here, the lens 23 is a lens to converge a light laser beam, and is formed integrally with the array-type semiconductor laser device 20. Since the lens 23 is formed integrally with the array-type semiconductor laser device 20, the optical module 1 is further miniaturized.

The SOI substrate 10 is a substrate in which an insulating layer ($SiO_2$ layer) made of silicon oxide ($SiO_2$) and a surface Si layer are stacked in order on a silicon (Si) substrate. In the embodiment, the manipulation lever 11, the element portion 12, the support springs 13, and banks are formed integrally with the SOI substrate 10 by processing the surface of the SOI substrate 10.

The element portion 12 includes an optical element that optically couples two optical transmission paths together. For example, the element portion 12 includes a base that supports the optical element, and the optical element is attached to the base or formed integrally therewith. In the embodiment, the element portion 12 is a mirror whose mirror surface 12a to reflect laser light serves as the optical element. The element portion 12 changes the traveling direction of laser light to optically couple the transmission path of light emitted from the array-type semiconductor laser device 20 to the optical waveguide 30. The optical element is not limited to a mirror but may be a lens or the like.

The manipulation lever 11 is extended on the surface of the Si substrate in the SOI substrate 10, and is manipulated when moving the element portion 12 on the substrate surface. In the embodiment, the manipulation lever 11 is provided to extend in the z-axis direction, and one end of the manipulation lever 11 that is located on the left side in FIG. 2 is connected to the element portion 12. A handle 11a is provided at the other end of the manipulation lever 11.

The support spring 13 is connected at one end to the element portion 12 and connected at the other end to the bank 14. In the embodiment, the support spring 13 is provided to extend in the x-axis direction, and does not appear in the cross-section in FIG. 1.

In the optical module 1 according to the embodiment, the manipulation lever 11, the element portion 12, and the support springs 13 are formed using a micro-electro-mechanical systems (MEMS) processing technique. Specifically, the manipulation lever 11, the element portion 12, and the support springs 13 are formed by etching the surface Si layer and the insulating layer of the SOI substrate 10 to cut out the external shapes of the manipulation lever 11, the element portion 12, and the support springs 13, and then removing only the insulating layer below the surface Si layer in the external shapes by etching. By such a step, clearance is formed between the surface of the Si substrate located below the insulating layer of the SOI substrate 10 and the manipulation lever 11, the element portion 12, and the support springs 13. The support springs 13 support, with the end portions thereof connected to the bank 14 as support points, the support springs 13 themselves, the element portion 12, and the manipulation lever 11 in a suspension state above the Si substrate surface. By integrally forming the manipulation lever 11, the element portion 12, and the support springs 13 in the surface Si layer of the SOI substrate 10, an optical axis adjustment mechanism that is minute and has a wide movable range can be obtained, and thus the optical module 1 having a wide optical axis adjustment range and miniaturized is obtained.

The bank 14 is a projected portion raised from the Si substrate surface of the SOI substrate 10. For example, the element portion 12, the manipulation lever 11, and the support springs 13 are formed by thinning the surface of the SOI substrate 10; on the other hand, the bank 14 is formed by not thinning but leaving the surface in the SOI substrate 10. The bank 14 is provided with a lever-opposing portion 14a that is a portion including a step face that faces the side face of the manipulation lever 11 along the longitudinal direction (z-axis direction).

In the embodiment as shown in FIG. 2, the support springs 13 extend in a direction different from the manipulation lever 11. That is, the manipulation lever 11 extends basically in the z-axis direction in a state before adjustment to be described later, while the direction in which the support spring 13 easily expands or contracts is the x-axis direction. Moreover, the support springs 13 are provided respectively on the positive direction side and the negative direction side of the x-axis as viewed from the element portion 12. Also, the banks 14 are provided respectively on the positive direction side and the negative direction side of the x-axis as viewed from the manipulation lever 11. Specifically, each of the two banks 14 includes the lever-opposing portion 14a extending in the z-axis direction from the vicinity of the element portion 12 to the vicinity of the handle 11a with respect to the z-coordinate. The two lever-opposing portions 14a are disposed opposite to each other with the manipulation lever 11, the element portion 12, and the support springs 13 interposed therebetween. An end portion of each of the banks 14 on the element portion 12 side is connected to an end portion of the support spring 13 on the side opposite to the element portion 12.

In the SOI substrate 10, the manipulation lever 11, the element portion 12, the support spring 13, and the bank 14 from the connection point of the support spring 13 to the lever-opposing portion 14a form a step connected in a bay shape in a plan view of the SOI substrate 10. With this step, a reservoir portion 15 that is a depressed portion surrounded in the bay shape is formed on the surface of the SOI substrate 10. In the embodiment, the reservoir portion 15 is formed on each of the positive direction side and the negative direction side of the x-axis as viewed from the manipulation lever 11. The bottom surface of the depressed portion has basically the height of the Si substrate surface.

The optical module 1 includes an adhesive 16 poured into the reservoir portion 15 and cured therein. The adhesive 16 fixes the manipulation lever 11, the element portion 12, and the support springs 13 to the SOI substrate 10. For example, the adhesive 16 is a UV curable resin or solder.

As shown in FIG. 1, the element portion 12 includes the mirror surface 12a, and the mirror surface 12a faces obliquely upward so that a first optical path between the mirror surface 12a and the optical waveguide 30 does not overlap a second optical path between the mirror surface 12a and the array-type semiconductor laser device 20. With this configuration, laser light emitted from the array-type semiconductor laser device 20 in the negative direction with respect to the y-axis is reflected in the positive direction with respect to the z-axis, and incident on the optical waveguide 30. It is easy to miniaturize the element portion 12, and by providing the element portion 12 at the tip of the manipulation lever 11, the optical axis adjustment mechanism can be miniaturized and thus the optical module 1 can be miniaturized, compared to the case where other optical components such as a ball lens are provided at the manipulation lever 11. Moreover, the distance between the element portion 12 and the optical waveguide 30 can be shortened, and thus the optical module 1 can be miniaturized. Although the mirror surface 12a of the element portion 12 according to the embodiment is a plane whose normal direction is contained in the y-z plane, the mirror surface 12a may be a curved surface or a plane whose normal direction deviates from the y-z plane.

The support springs 13 couple the element portion 12 with the SOI substrate 10 such that the element portion 12 can change its direction by movement or rotation along at least two axes. Specifically, the support springs 13 are provided such that the element portion 12 can move along the x-axis, the y-axis, and the z-axis. Moreover, the support springs 13 are provided such that the element portion 12 can rotate about the x-axis, the y-axis, and the z-axis. Since the element portion 12 can change its direction by movement or rotation along at least two axes as described above, an optical axis can be adjusted such that laser light is coupled to the optical waveguide 30. Moreover, since the optical axis adjustment mechanism is provided independently for each of a plurality of laser beams emitted from the array-type semiconductor laser device 20, optical coupling can be optimized for all of the optical waveguides 30. Although the support spring 13 according to the embodiment is elastically deformed, the support spring 13 may be plastically deformed. Moreover, the magnitude of an external force necessary for displacing the element portion 12 and the holding force of the element portion 12 can be appropriately adjusted by adjusting the number of stages, or the width, of a spring of the support spring 13.

The manipulation lever 11 extends from the element portion 12 in a direction in which the manipulation lever avoids approaching the optical waveguide 30. Specifically, the manipulation lever 11 extends in the negative direction with respect to the z-axis. In other words, the manipulation lever 11 extends in the same direction as the extending direction of the optical waveguide 30. Since the manipulation lever 11 extends in the direction in which the manipulation lever 11 avoids approaching the optical waveguide 30, the movable range of the manipulation lever 11 can be widely secured, and the manipulation lever 11 can be manipulated at a position where the manipulation lever 11 does not interfere with the array-type semiconductor laser device 20 or the like. Therefore, the adjustable range and manipulability of the optical axis adjustment mechanism become favorable.

The bank 14 is disposed at a position where the bank 14 does not prevent, during adjustment, the movement of each part of the optical axis adjustment mechanism including the manipulation lever 11, the element portion 12, and the support springs 13 described above. The bank 14 constitutes a portion of the bay-shaped step around the reservoir portion 15.

The reservoir portion 15 has the function of storing the adhesive 16 poured thereinto for fixing the optical axis adjustment mechanism. With regard to the function, the bank 14 acts as a dam that blocks the outflow of the adhesive 16. That is, the bank 14 prevents the adhesive 16 in the reservoir portion 15 from spreading in a direction away from the optical axis adjustment mechanism, and maintains the state where a sufficient amount of adhesive 16 adheres to the optical axis adjustment mechanism.

Moreover, the reservoir portion 15 includes, in the vicinity of the end portion of the manipulation lever 11 on the handle 11a side, an outflow blocking portion that blocks the outflow of the adhesive 16 before curing. The step composed of the manipulation lever 11, the element portion 12, the support spring 13, and the bank 14, which form the depressed portion serving as the reservoir portion 15, has a bay shape, and the step is not present at an opening of the bay shape. The outflow blocking portion acts to make the adhesive 16 less likely to flow out through the opening.

In the embodiment, a portion of the bank 14 constitutes an outflow blocking portion 14b. In a plan view, the outflow blocking portion 14b is a projected portion that projects from the position of the lever-opposing portion 14a in the vicinity of the opening toward the handle 11a as the end portion of the manipulation lever 11. For example, in the plan view, the outflow blocking portion 14b can have a shape that extends in the x-axis direction from the end portion of the lever-opposing portion 14a extending in the z-axis direction and has a constant width in the z-axis direction.

The outflow blocking portion 14b narrows the opening of the bay-shaped depressed portion to make the adhesive 16 less likely to flow out of the reservoir portion 15. Moreover, the outflow blocking portion 14b is configured so as to mainly narrow the frontage of the bay shape but not to basically narrow the depth of the bay shape. With this configuration, the outflow blocking portion 14b makes it possible to store a sufficient amount of adhesive 16 in the reservoir portion 15 for fixing the optical axis adjustment mechanism.

Figure 3A:
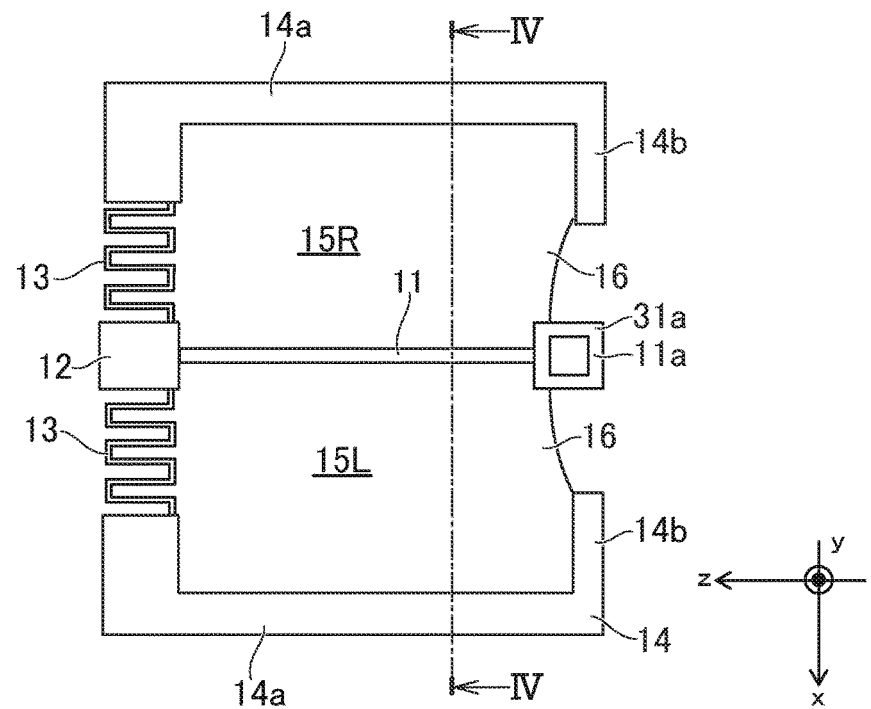
FIG. 3A is a schematic top view of an optical axis adjustment mechanism in the first embodiment.
Figure 3B:
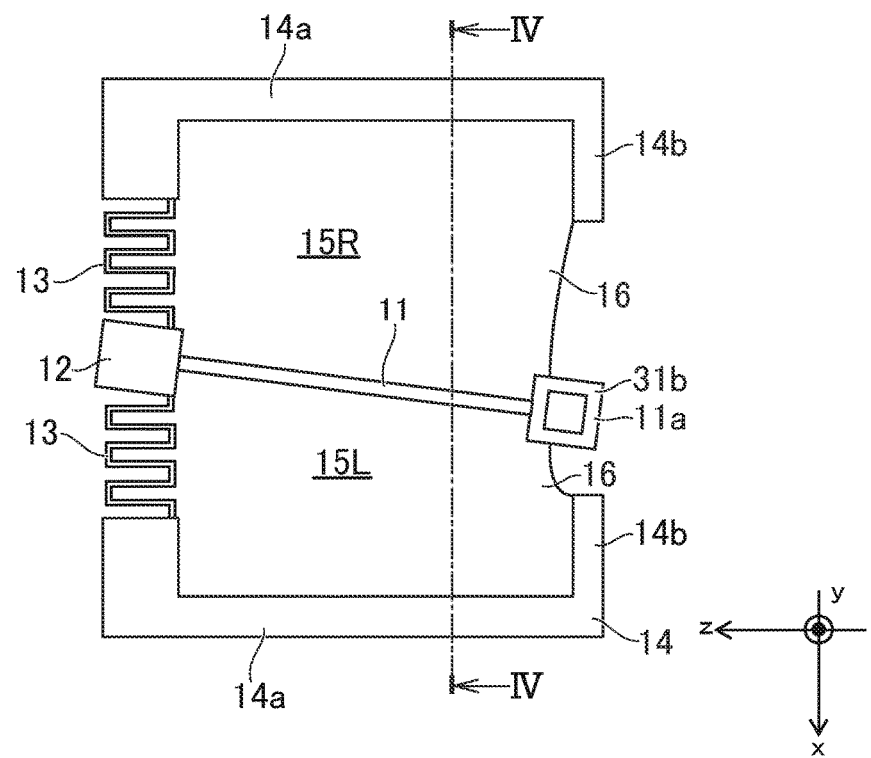
FIG. 3B is a schematic top view of the optical axis adjustment mechanism in the first embodiment.

FIGS. 3A and 3B are schematic top views of a portion relating to one optical axis adjustment mechanism in the SOI substrate 10 of the optical module 1. In a state before adjustment, the manipulation lever 11 extends basically in the z-axis direction as described above. FIG. 3A shows this state, in which the manipulation lever 11 is located at a position 31a along the z-axis direction. On the other hand, the manipulation lever 11 is moved by adjustment, and may form an angle with respect to the z-axis. FIG. 3B shows an example of this state.

Here, for convenience sake, the central axis of the manipulation lever 11 in the state of FIG. 3A is defined as the z-axis; the side on which the x-coordinate is negative (the upper side of the position 31a in FIG. 3) in the optical axis adjustment mechanism is defined as the right side; and the side on which the x-coordinate is positive (the lower side of the position 31a in FIG. 3) is defined as the left side. In FIG. 3B, the handle 11a is moved to the left side from the position 31a, and the manipulation lever 11 rotates in a clockwise direction about the element portion 12.

Figure 4A:
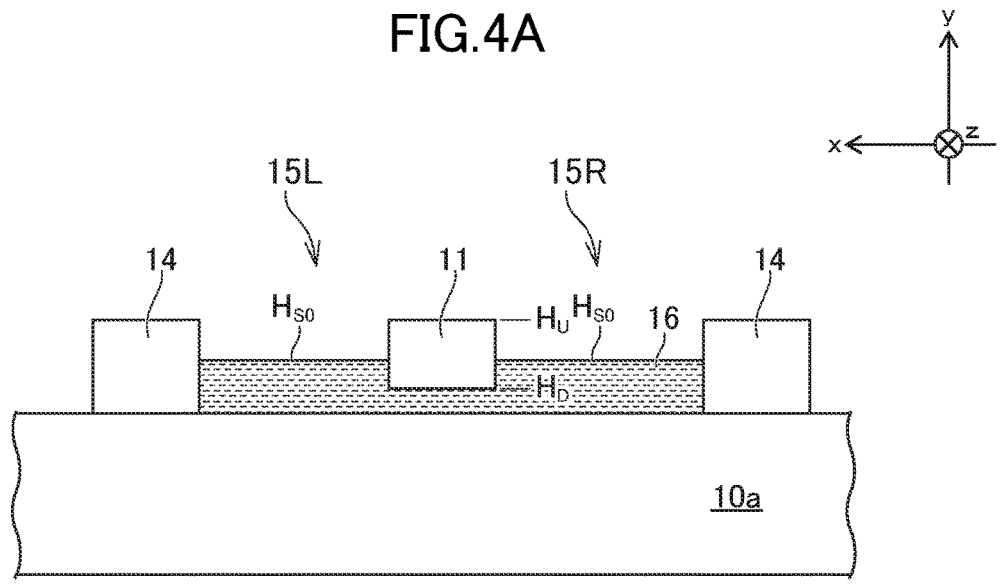
FIG. 4A is a schematic vertical sectional view taken along line IV-IV of FIG. 3A.
Figure 4B:
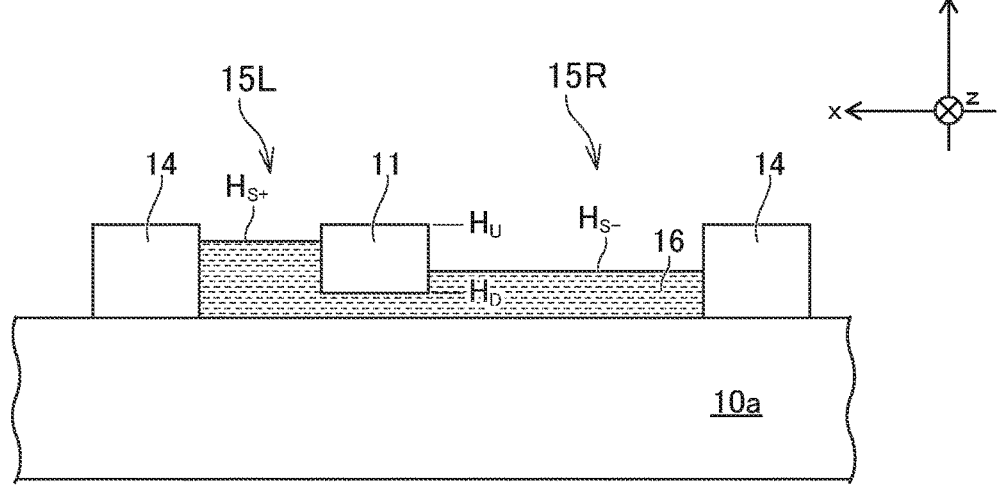
FIG. 4B is a schematic vertical sectional view taken along line IV-IV of FIG. 3B.

FIGS. 4A and 4B are partial sectional views of the SOI substrate 10 along lines IV-IV of FIGS. 3A and 3B, and are vertical sectional views respectively corresponding to FIGS. 3A and 3B. Here, with the surface of a Si substrate 10a of the SOI substrate 10 as a height reference, that is, as a height of 0, the heights of the lower and upper surfaces of the manipulation lever 11, the element portion 12, and the support spring 13 are respectively represented by $H_D$ and $H_U$. Moreover, for example, the height of the surface of the adhesive at the side faces of the manipulation lever 11, the element portion 12, and the support spring 13 is represented by $H_S$. When the manipulation lever 11 or the bank 14 is formed by etching the SOI substrate 10, for example the thickness of the insulating layer of the SOI substrate 10 corresponds to $H_D$. Moreover, the height of the surface of the surface Si layer may correspond to $H_U$, and the height of the bank 14 may be basically $H_U$.

In the embodiment, the shape of the optical axis adjustment mechanism in a plan view is line symmetric with respect to the central axis, along the z direction, of the manipulation lever 11 located at the position 31a; and the manipulation lever 11, the element portion 12, the support springs 13, and the banks 14 are basically bilaterally symmetric (vertically symmetric in FIG. 3A) in the left and right definition described above. In this case, in the state before adjustment where the manipulation lever 11 is located at the position 31a, a reservoir portion 15R on the right side and a reservoir portion 15L on the left side basically have the same size, and the same amount of adhesive 16 is basically injected into the reservoir portion 15R and the reservoir portion 15L. This is shown in FIG. 4A by the fact that the heights $H_S$ of the adhesives 16 in the reservoir portions 15 on the left and right sides are the same height $H_{S0}$. In the embodiment, $H_D$ is approximately 2 μm; however, $H_D$ is not limited to this and may be appropriately selected according to the kinds of adhesives to be used or the positional relationship between $H_D$ and other structures.

When the manipulation lever 11 is moved from the state of FIGS. 3A and 4A to a position 31b, the reservoir portion 15R on the right side is widened while the reservoir portion 15L on the left side is narrowed. The result is shown, in FIG. 4B, as a state where the adhesive 16 spreads in the reservoir portion 15R on the right side and is lower in height than the state shown in FIG. 4A and the adhesive 16 in the reservoir portion 15L on the left side is collected and higher in height than the state shown in FIG. 4A. At this time, $H_S$ on the right side is represented by $H_{S-}$; $H_S$ on the left side is represented by $H_{S+}$; and the formula: $H_{S+} > H_{S0} > H_{S-}$ is satisfied. For example, when the viscosity of the adhesive is low or when the position fluctuation of the manipulation lever 11 is small, the heights of the adhesives at the side faces of the manipulation lever 11 may be substantially equal to each other due to temporal change. However, the state immediately after the lever position fluctuation is shown herein.

Here, using, as a comparative example, the structure of an optical axis adjustment mechanism not including the lever-opposing portion 14a or the outflow blocking portion 14b, the structure of the optical axis adjustment mechanism of the embodiment including the bank 14 including the lever-opposing portion 14a and the outflow blocking portion 14b is compared with the comparative example.

In the comparative example, an adhesive injected in the vicinity of the manipulation lever 11 is likely to extend outward as viewed from the manipulation lever 11, and is less likely to form a thick adhesive layer. Therefore, a contact area between the adhesive and the manipulation lever 11, the element portion 12, and the support spring 13 is small, and thus fixation between them is likely to be insufficient. Here, it can be considered that a contact area $S_C$ between the adhesive and the side faces of the manipulation lever 11, the element portion 12, and the support spring 13 is roughly proportional to $H_S - H_D$. Accordingly, $S_C$ is reduced as $H_S$ is reduced with a thinned adhesive layer, and thus adhesion strength may be lowered. In particular, $H_S$ on the side opposite to the moving direction of the manipulation lever 11 (e.g., the right side of the manipulation lever 11 when the manipulation lever 11 is moved to the left side) is at a value $H_{S-}$, which is smaller than the value $H_{S0}$ before the movement of the manipulation lever 11, and the adhesion strength may be further lowered.

In contrast to this, in the optical axis adjustment mechanism of the embodiment provided with the bank 14 and including the reservoir portion 15, the thickness of the adhesive 16 can be increased according to the height (e.g., $H_U$) of the bank 14, and thus an increase in the contact area $S_C$ can be achieved.

Moreover, the reservoir portion 15 functions as a buffer to reduce a change in the thickness of the adhesive 16 relative to the movement of the manipulation lever 11, and thus makes it possible to secure the contact area $S_C$ with which sufficient adhesion strength is obtained irrespective of the position of the manipulation lever 11.

For example, the areas of the reservoir portions 15L and 15R in the state of FIGS. 3A and 4A where the manipulation lever 11 is located at the center are represented by $A_0$, and the areas of the reservoir portions 15L and 15R in the state where the manipulation lever 11 is moved maximally to the left side are respectively represented by $A_0 - \Delta A$ and $A_0 + \Delta A$. In addition, under the assumption that the area of the adhesive 16 injected into the reservoir portion 15 is proportional to the area of the reservoir portion 15, when the heights $H_S$ of the adhesives 16 in the reservoir portions 15L and 15R in the state where the manipulation lever 11 is moved maximally to the left side are respectively represented by $H_{S0} + \Delta H$ and $H_{S0} - \Delta H$, the following formula is approximately satisfied.

$$\Delta H/H_{S0} = \Delta A/A_0 \quad (1)$$

It is preferable to set the upper limit of the height of the adhesive 16 to $H_U$ or less. Accordingly, the following formula is satisfied.

$$H_{S0} + \Delta H \leq H_U \quad (2)$$

Moreover, when the minimum value of the height of the adhesive 16 to provide the contact area $S_C$ with which sufficient adhesion strength is obtained is expressed by $H_L$, the following formula is satisfied.

$$H_{S0} - \Delta H \geq H_L \quad (3)$$

From the formulae (2) and (3), the following formula is obtained.

$$\Delta H \leq (H_U - H_L)/2 \quad (4)$$

Here, when $H_{S0}$ is eliminated from the formulae (2) and (3) using the formula (1), the upper and lower limits of $\Delta H$ are represented as the functions of $\Delta A/A_0$. It can be seen from the nature of the functions that $\Delta H$ takes the maximum value when the upper and lower limits are equal to each other and in which case $\Delta A/A_0$ also takes the maximum value. This is also understood intuitively, because the effect of the reservoir portion 15 as a buffer described above is reduced as $A_0$ is smaller relative to a certain $\Delta A$, that is, as $\Delta A/A_0$ is larger, and thus the difference in height ($2\Delta H$) between the adhesives 16 on the left and right sides of the manipulation lever 11 is increased. The maximum value of $\Delta H$ is a value given by the right side of the formula (4), and the maximum value of $\Delta A/A_0$ is $(H_U - H_L)/(H_U + H_L)$.

That is, it is preferred in realizing the buffer function to set the area $A_0$ of the reservoir portion 15 for assumed $\Delta A$ so as to satisfy the following formula.

$$\Delta A/A_0 \leq (H_U - H_L)/(H_U + H_L) \quad (5)$$

On the other hand, $A_0$ should be smaller in achieving the miniaturization of the optical module 1 by reducing the size of the optical axis adjustment mechanism including the reservoir portion 15. Accordingly, for example, $A_0$ can be set to $\Delta A \cdot (H_U + H_L)/(H_U - H_L)$, which is a value at which an equal sign is established in the formula (5).

In the state of FIGS. 3B and 4B, the contact area $S_C$ between the adhesive 16 and the side face of the manipulation lever 11 facing the reservoir portion 15R is secured by the buffer function of the reservoir portion 15, and a stable adhesion state of the adhesive 16 to the manipulation lever 11 is realized.

In the reservoir portion 15L, on the other hand, as the moving amount of the manipulation lever 11 to the left side is larger, the adhesive 16 is raised and increased in outward spreading force. However, as the manipulation lever 11 moves further to the left side, the distance between the outflow blocking portion 14b and the manipulation lever 11 is shortened to narrow the opening of the reservoir portion 15L, and therefore, the adhesive 16 is less likely to flow out. That is, although the area $A_0$ of the reservoir portion 15 has to be increased to such an extent that the buffer function is obtained, it is possible by providing the outflow blocking portion 14b to increase $A_0$ while preventing the outflow of the adhesive 16 from the reservoir portion 15.

From this point of view, by making the distance from the handle 11a located at the end portion of the manipulation lever 11 to the projected portion tip of the outflow blocking portion 14b smaller than the distance from a portion of the manipulation lever 11 other than the handle 11a to the lever-opposing portion 14a, it is possible to secure the area of the reservoir portion 15 while narrowing the opening. The outflow blocking portion 14b is provided at a position where the outflow blocking portion 14b does not interfere with the manipulation lever 11 to be moved by adjustment.

Incidentally, although clearance is present between the support spring 13 and the Si substrate, it can be considered that the clearance has a small influence on the function of the reservoir portion 15 to store the adhesive 16 because the clearance is narrow.

The array-type semiconductor laser device 20 according to the embodiment is of the type in which a laser including the optical resonator 21 in a direction parallel to the SOI substrate 10 includes the mirror surface 22 causing oscillation light to be emitted in a direction vertical to the SOI substrate 10. However, the array-type semiconductor laser device 20 is not limited to this. For example, a so-called vertical cavity surface emitting laser (VCSEL) including an optical resonator in the direction vertical to the SOI substrate 10 and emitting oscillation light in the direction vertical to the SOI substrate 10 may be used. Further, an edge-emitting laser including an optical resonator in the direction parallel to the SOI substrate 10 and emitting oscillation light in the direction parallel to the SOI substrate 10 may be used. When the edge-emitting laser is used, it is preferable to employ, for example, an arrangement in which the emitting edge side is disposed so as to face the SOI substrate 10 and a condensing lens is separately provided between the emitting edge and the mirror surface 12a. Moreover, although the array-type semiconductor laser device 20 according to the embodiment is to oscillate laser light at a wavelength of approximately 1310 nm, the wavelength of laser light may be other wavelengths in the 1.3 μm band, which is generally used in optical communications, or wavelengths in the 1.55 μm band.

The mirror surface 12a of the element portion 12 may be a face at 45°, or may be a face other than that at 45° by subjecting the Si surface layer to anisotropic wet etching. In the case of silicon, a crystal face having an angle of inclination of approximately 54° can be formed by wet etching using potassium hydroxide. In that case, when, for example, emitted light is inclined from the y-axis to the edge side of the optical resonator 21 by approximately 18°, the optical axis of light reflected by the mirror surface 12a can be substantially parallel to the SOI substrate 10.

Figure 5:
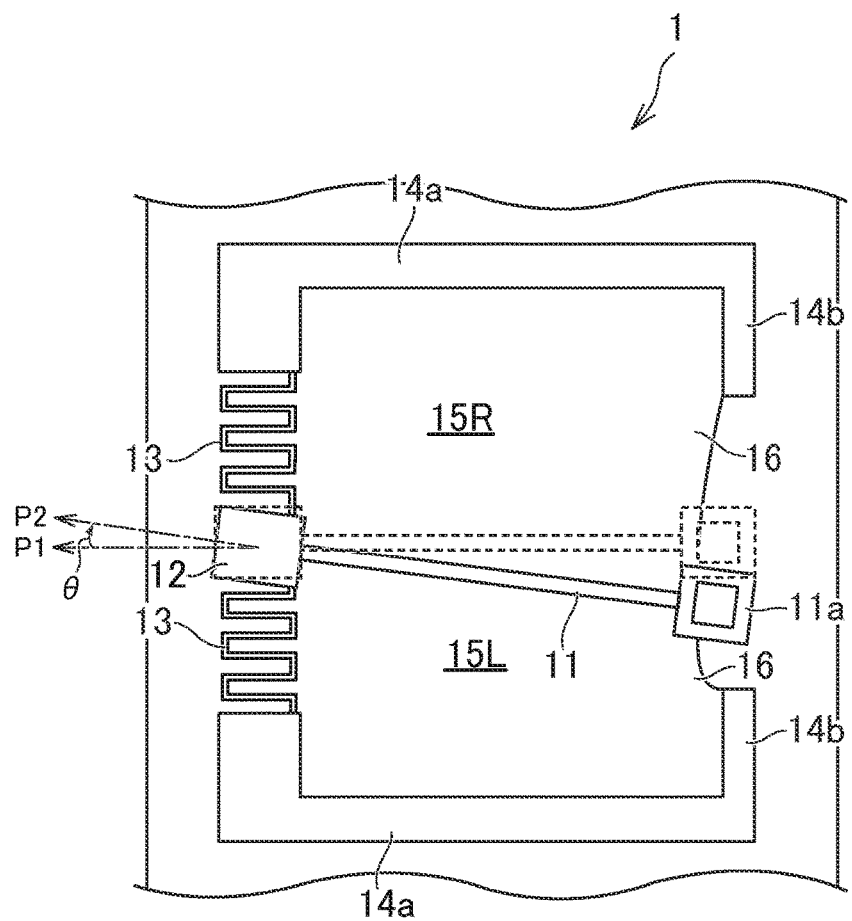
FIG. 5 is a top view showing an adjustment step in a manufacturing method of the optical module according to an embodiment of the invention.

FIG. 5 is a top view showing an adjustment step in a manufacturing method of the optical module 1 according to an embodiment of the invention. In the manufacturing method of the optical module 1 according to the embodiment, the step of integrally forming the manipulation lever 11, the element portion 12, and the support springs 13 in the SOI substrate 10 is performed as previously described. Moreover, separately from this step, a step of preparing the array-type semiconductor laser device 20 as a photonic device that oscillates or receives an optical signal in the embodiment, and a step of preparing the optical waveguide 30 for transmitting the optical signal, are performed. The lens 23 to condense laser light is integrated and formed in the array-type semiconductor laser device 20 in the embodiment; however, the lens 23 is not limited to this, and may be separately prepared. Next, these components are assembled into the form as shown in FIGS. 1 and 2. Moreover, at any time until this assembly is completed, a step of disposing the adhesive 16 in the reservoir portion 15 is performed (an adhesive disposing step). When the adhesive 16 is a UV curable resin, a liquid UV resin is injected into the reservoir portion 15 using a syringe-like injector. When the adhesive 16 is solder, a solder ball is put in the reservoir portion 15 and then heated into a molten state, or a solder pattern is previously produced on the SOI substrate and then heated into a molten state. In the specification, disposing an adhesive in a molten state is expressed as "injection". The expression "injection" as used herein includes, not only the case where a flowing adhesive is literally injected as described above, but also the case where a material to be heated into a molten state, such as solder, is used. In any case, in a step of performing an optical axis adjustment by moving the manipulation lever 11, the adhesive 16 is previously brought into the state of maintaining fluidity. Although an example in which the adhesive 16 is a UV curable resin or solder is mentioned in the invention, the adhesive 16 is not limited to this. A substitute material may be used for the adhesive 16 as long as the material has fluidity during the adjustment step and can maintain fixation after the adjustment step.

After assembly, the adjustment step is performed. The adjustment step is a step of manipulating the position or direction of the element portion 12 with the manipulation lever 11 to adjust the traveling direction of laser light reflected by the mirror surface 12a of the element portion 12. The adjustment step is performed while the adhesive 16 in the reservoir portion 15 maintains fluidity. For example, when the adhesive 16 is a UV curable resin, the adjustment step is performed in a UV-cut environment. When solder is used for the adhesive 16, the solder is heated by a heater or the like to maintain the molten state thereof.

In the example shown in FIG. 5, the direction of the optical axis is rotated about the y-axis by an angle θ, and thus changed from a first direction P1 to a second direction P2. Even when an error in the attachment position of the array-type semiconductor laser device 20 or the optical waveguide 30 occurs in a previous step, the optical signal is optically coupled reliably to the optical waveguide 30 by the adjustment step, and thus the optical module 1 capable of transmitting the optical signal with reduced loss is obtained.

In the adjustment step, the direction of the element portion 12 is manipulated by applying an external force to the end portion (the handle 11a) of the manipulation lever 11 located on the side opposite to the optical waveguide 30 with respect to a position where the element portion 12 is disposed. The handle 11a may be one that can be grasped by a manipulator or can be hooked. The external force applied to the handle 11a may be a contact force that is directly applied by the manipulator. However, the external force applied to the handle 11a may be a distant force such as an electrostatic force.

After the adjustment step, an adhesive curing step in which the manipulation lever 11 and the support spring 13, which are movable portions connecting to the element portion 12, are fixed together with the element portion 12 to the SOI substrate 10 by curing the adhesive 16 is performed. With this configuration, the position and direction of the element portion 12 are fixed in the adjusted state, and thus the optical module 1 in which laser lights from the array-type semiconductor laser device 20 are optically coupled reliably to the optical waveguides 30 is obtained. Moreover, since, for example, the vibrations of the manipulation lever 11 and the support spring 13 are prevented because the manipulation lever 11 and the support spring 13 are fixed, the vibrations are prevented from transmitting to the element portion 12 and adversely affecting optical coupling.

Although only a portion of the manipulation lever 11 may be fixed, it is preferable for stable fixation to fix the whole of the manipulation lever 11, if possible, a region including a portion near the handle 11a to the support spring 13.

In the configuration shown in FIG. 2, the support spring 13 is extended in the direction different from the manipulation lever 11. With this configuration, the direction in which the support spring 13 easily expands or contracts is orthogonal to the extending direction of the manipulation lever 11, and the movable range of the element portion 12 is widened. Moreover, since the reservoir portions 15 are provided on the left and right sides of the manipulation lever 11, the manipulation lever 11 can be fixed from the both left and right sides and thus the strength for fixing the manipulation lever 11 is increased.

In the optical module 1 according to the embodiment, the support point of the support spring 13 is not provided between the element portion 12 and the optical waveguide 30, but is provided at the bank 14 distant from the element portion 12 in the x-axis direction, which is a direction in which the support spring 13 does not approach the optical waveguide 30. With this configuration, the distance between the element portion 12 and the optical waveguide 30 can be reduced, and thus the optical module 1 can be miniaturized. Although the support spring 13 is referred to as "spring" in the embodiment, the term "spring" merely expresses the function thereof. The support spring 13 does not necessarily have a so-called spring shape as long as it can elastically move the element portion 12, and may be any elastic body.

(First Modified Example)

Figure 6:
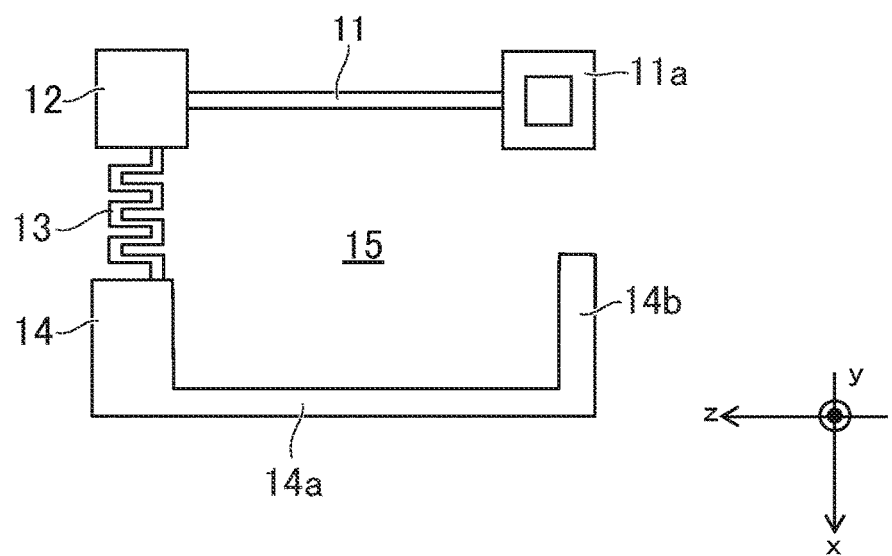
FIG. 6 is a schematic top view of an optical axis adjustment mechanism according to a first modified example of the first embodiment.

FIG. 6 is a top view showing an optical axis adjustment mechanism of an optical module 1A according to a first modified example of the first embodiment. In FIG. 6, the adhesive 16 in the reservoir portion 15 is omitted.

Each of the optical axis adjustment mechanisms of the optical module 1 of the first embodiment has the structure bilaterally symmetric about the manipulation lever 11 along the z-axis in a plan view; however, the optical axis adjustment mechanism of the modified example has a structure composed of one side of the bilaterally symmetric structure. That is, in the modified example, the numbers of the support springs 13 and the banks 14 are one, and only one side of the element portion 12 in the x-axis direction is supported by the support spring 13. Although the support spring 13 is provided only on one side, the fixedness of the manipulation lever 11 can be sufficiently ensured because the adhesive 16 can be sufficiently disposed due to the presence of the reservoir portion 15.

By providing the support spring 13, the bank 14, and the reservoir portion 15 only on one side of the manipulation lever 11 as in the modified example, the optical axis adjustment mechanism can be further miniaturized compared to the first embodiment, and the whole of the optical module 1A can be made small when formed in an array.

(Second Modified Example)

Figure 7:
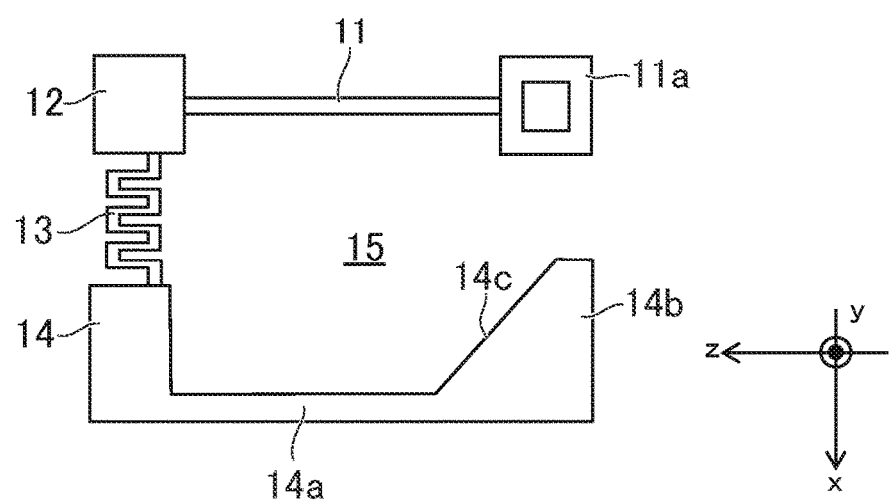
FIG. 7 is a schematic top view of an optical axis adjustment mechanism according to a second modified example of the first embodiment.

FIG. 7 is a top view showing an optical axis adjustment mechanism according to a second modified example of the first embodiment. In FIG. 7, the adhesive 16 in the reservoir portion 15 is omitted. The feature of the modified example is the shape of the outflow blocking portion 14b. Although the shape is shown as a one-side support configuration similarly to the first modified example, the outflow blocking portions 14b of the two banks 14 in the both-side support configuration of the first embodiment can be employed as the shape of the modified example.

In the outflow blocking portion 14b of the modified example, a step 14c facing the inside of the reservoir portion 15 is obliquely formed in FIG. 7. For example, the outflow blocking portion 14b has a shape in which the width thereof in the z-axis direction is narrowed from the bank 14 side toward the manipulation lever 11 side in a plan view. Correspondingly, the reservoir portion 15 has a shape in which the width thereof in the z-axis direction is narrowed as the x-coordinate moves from the position at the tip of the outflow blocking portion 14b toward the lever-opposing portion 14a side.

(Third Modified Example)

Figure 8:
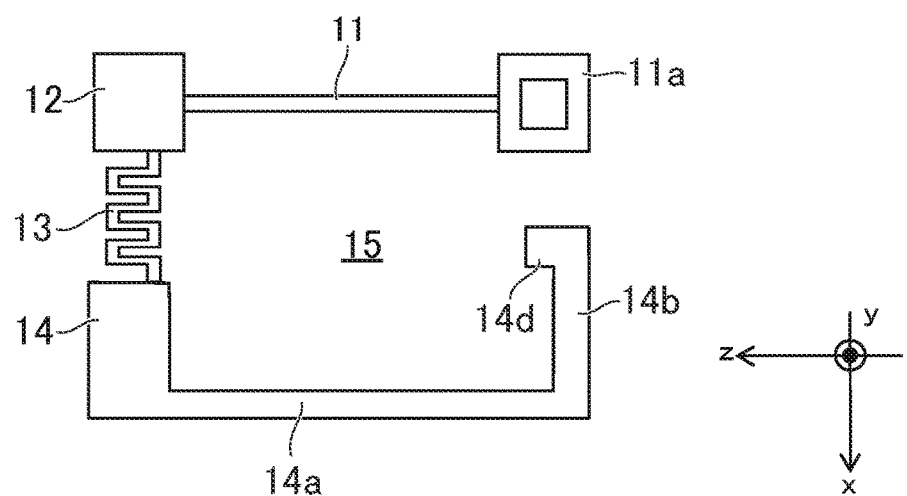
FIG. 8 is a schematic top view of an optical axis adjustment mechanism according to a third modified example of the first embodiment.

FIG. 8 is a top view showing an optical axis adjustment mechanism according to a third modified example of the first embodiment. In FIG. 8, the adhesive 16 in the reservoir portion 15 is omitted. The feature of the modified example is the shape of the outflow blocking portion 14b. Although the shape is shown as a one-side support configuration similarly to the first modified example, the outflow blocking portions 14b of the two banks 14 in the both-side support configuration of the first embodiment can be employed as the shape of the modified example. The outflow blocking portion 14b of the modified example includes, at the tip, a projection 14d directed to the inside of the reservoir portion 15. The outflow blocking portion includes a barb (14d) for the flow of the adhesive compared to the first embodiment, and therefore, the effect of preventing adhesive outflow from the bank 14 can be enhanced.

(Fourth Modified Example)

Figure 9:
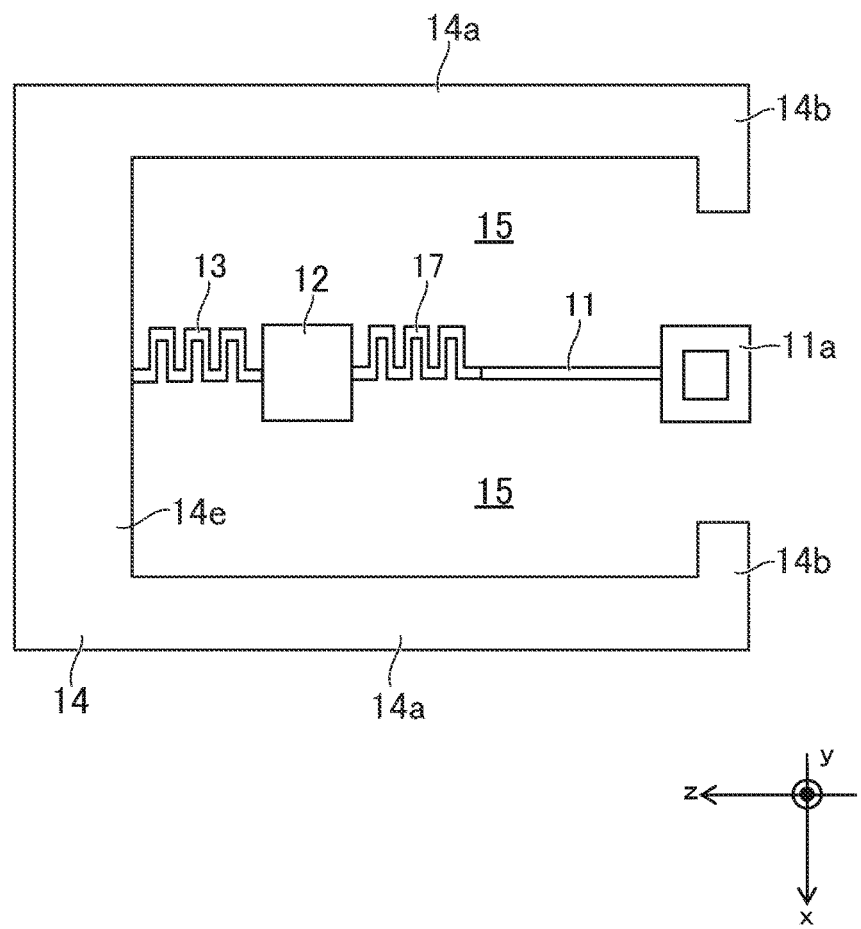
FIG. 9 is a schematic top view of an optical axis adjustment mechanism according to a fourth modified example of the first embodiment.

FIG. 9 is a top view showing an optical axis adjustment mechanism according to a fourth modified example of the first embodiment. In FIG. 9, the adhesive 16 in the reservoir portion 15 is omitted.

In the modified example, the support spring 13 having a support point at the bank 14 and supporting the element portion 12 is disposed along the z-axis direction. Specifically, the manipulation lever 11, the element portion 12, and the support spring 13 are disposed on one line along the z-axis. Moreover, a spring 17 may be disposed between the element portion 12 and the manipulation lever 11. The bank 14 includes the lever-opposing portions 14a disposed on both sides of the manipulation lever 11 and opposite to each other, the outflow blocking portions 14b at the respective one end portions of the lever-opposing portions 14a, and a coupling portion 14e connecting the other end portions of the two lever-opposing portions 14a. The support point of the support spring 13 is provided at the coupling portion 14e.

The modified example can employ a configuration in which the manipulation lever 11, the element portion 12, and the support spring 13 are aligned on a straight line in the configuration in which the reservoir portion 15 is provided only on one side of the manipulation lever 11 as in the first to third modified examples.

(Fifth Modified Example)

Figure 10:
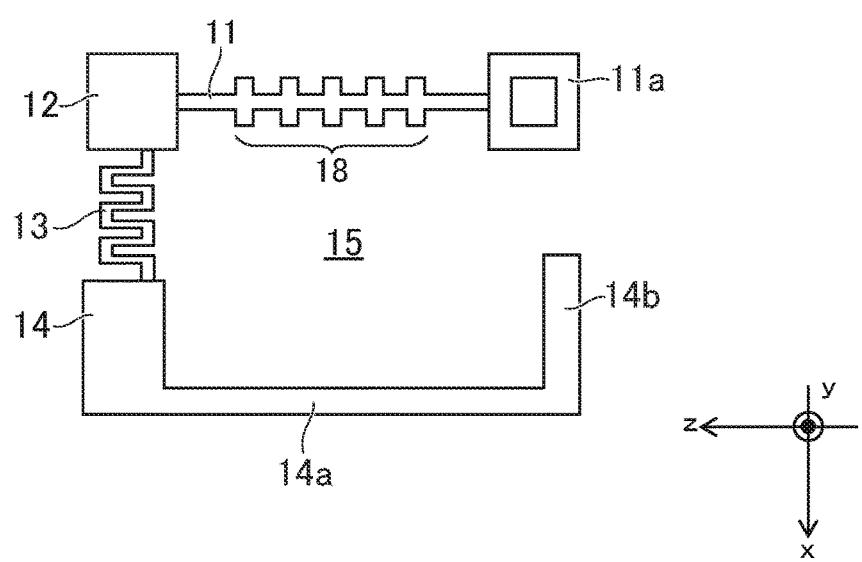
FIG. 10 is a schematic top view of an optical axis adjustment mechanism according to a fifth modified example of the first embodiment.
Figure 11:
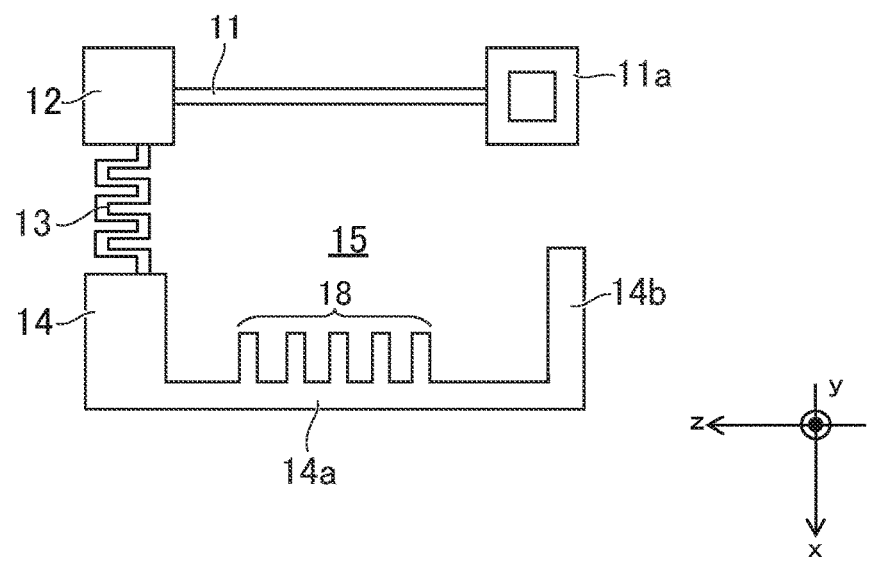
FIG. 11 is a schematic top view of an optical axis adjustment mechanism according to the fifth modified example of the first embodiment.

FIGS. 10 and 11 are top views showing optical axis adjustment mechanisms according to a fifth modified example of the first embodiment. In FIGS. 10 and 11, the adhesive 16 in the reservoir portion 15 is omitted. The feature of the modified example is that depressions and projections 18 are provided on a side face forming the bay shape of the reservoir portion 15. For example, the configuration of FIG. 10 includes the depressions and projections of a fin structure on the side face of the manipulation lever 11. The configuration of FIG. 11 includes the depressions and projections of a fin structure on the side face of the lever-opposing portion 14a. The depressions and projections are formed in a shape and size that allow the adhesive 16 to enter the depressed portions. With this configuration, the adhesion area of the adhesive 16 is increased, and the strength of the adhesive 16 when cured is increased.

In FIGS. 10 and 11, the modified example is shown as a one-side support configuration similarly to the first modified example; however, the feature of the modified example can be applied also to the both-side support configuration of the first embodiment.

(Second Embodiment)

Hereinafter, a second embodiment will be described focusing on differences from the first embodiment, while the description of common features is basically omitted.

Figure 12:
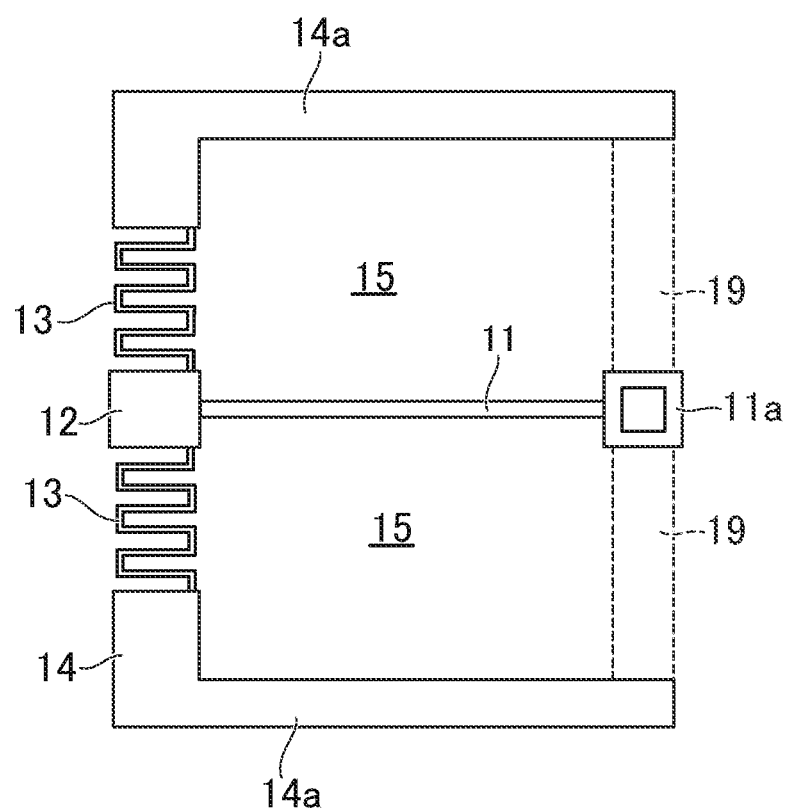
FIG. 12 is a schematic top view of an optical module according to a second embodiment of the invention.

FIG. 12 is a schematic top view of an optical module 1B according to the second embodiment. In FIG. 12, the adhesive 16 in the reservoir portion 15 is omitted. The optical module 1B basically differs from the first embodiment in outflow blocking portions 19. The outflow blocking portion 14b of the first embodiment is a portion of the bank 14, and is a projected portion forming a step on the Si substrate surface. In contrast to this, the out flow blocking portion 19 is formed at an opening of the reservoir portion 15, that is, at an opening in a bay shape formed, in a plan view, by a step formed by the manipulation lever 11, the element portion 12, the support spring 13, and the bank 14 from a connection point with the support spring 13 to the lever-opposing portion 14a. The outflow blocking portion 19 is a substrate surface having low wettability with respect to the adhesive 16, compared to an inner region of the reservoir portion 15 that is recessed into the bay shape from the opening.

In the embodiment, the outflow blocking portion 19 is formed, on a Si substrate, in a band-like region connecting the handle 11a of the manipulation lever 11 located at a position along the z-axis with the position of the lever-opposing portion 14a in the vicinity of the opening.

When the area of the reservoir portion 15 is reduced with the movement of the manipulation lever 11 as described above, the adhesive 16 is raised and increased in outward spreading force. Therefore, it is preferred to form the outflow blocking portion 19 in a region at a position and having a shape and width such that the outflow blocking portion 19 closes the opening of the reservoir portion 15 in the state where the area thereof is reduced with the movement of the manipulation lever 11. It is more preferred to form the outflow blocking portion 19 in a region at a position and having a shape and width such that the outflow blocking portion 19 closes the opening of the reservoir portion 15 in the state where the area thereof is increased with the movement of the manipulation lever 11.

For example, the outflow blocking portion 19 is formed by causing a release agent for the adhesive 16 to selectively adhere to the region. The adhesion is performed by a method such as evaporation or application.

In the first to fifth modified examples of the first embodiment, the outflow blocking portion 19 can be provided instead of the outflow blocking portion 14b. Moreover, the outflow blocking portion 19 can be formed at the opening of the reservoir portion 15 including the outflow blocking portion 14b of the bank 14 in the first embodiment and the modified examples thereof.

(Third and Fourth Embodiments)

Figure 13:
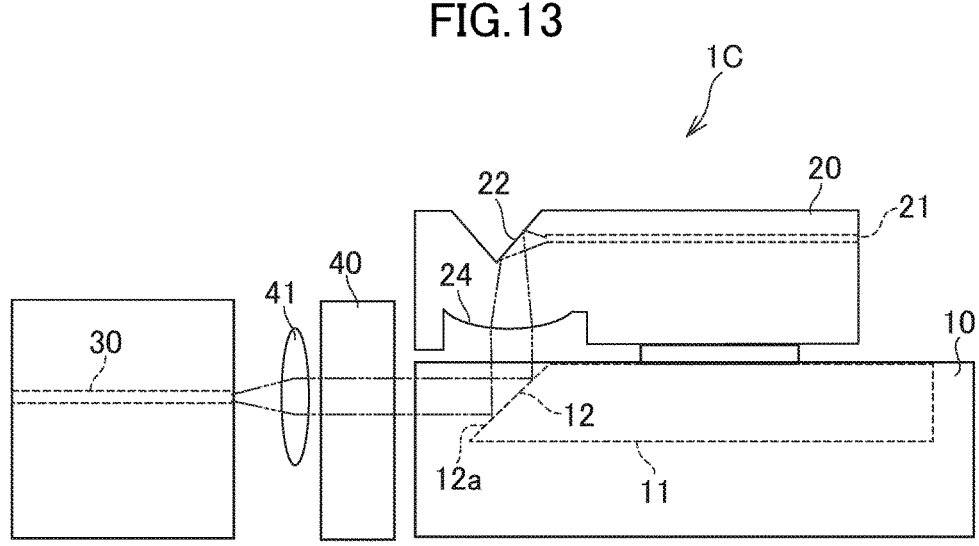
FIG. 13 is a schematic side view of an optical module according to a third embodiment of the invention.
Figure 13:
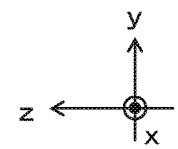

The feature of the invention is mainly the optical axis adjustment mechanism, and portions other than that, especially the configurations of portions other than the SOI substrate 10, are not limited to those of the embodiments described above. FIGS. 13 and 14 show embodiments showing the examples.

FIG. 13 is a side view showing an optical module 1C according to a third embodiment. The optical module 1C further includes an optical isolator 40 between the mirror surface 12a of the element portion 12 and the optical waveguide 30. The optical isolator 40 transmits light traveling in the positive direction of the z-axis but blocks light traveling in the negative direction of the z-axis. Therefore, return light to the array-type semiconductor laser device 20 is suppressed.

Moreover, in the optical module 1C, a lens formed integrally with the array-type semiconductor laser device 20 is a collimating lens 24. The collimating lens 24 converts divergent light reflected by the mirror surface 22 to parallel light, and causes the parallel light to be incident on the mirror surface 12a. Therefore, parallel light is incident on the optical isolator 40.

A converging lens 41 is provided between the optical isolator 40 and the optical waveguide 30. The converging lens 41 converges the parallel light transmitted through the optical isolator 40, and causes the light to be optically coupled to the optical waveguide 30. In the first embodiment, the joined portion of the support spring 13 and the SOI substrate 10 is not present on the optical waveguide 30 side, and an empty space is provided between the mirror surface 12a and the optical waveguide 30. Therefore, as shown in the embodiment, the optical isolator 40 and the like can be disposed in this space, and a significant increase in the size of the entire optical module can be prevented.

FIG. 14 is a side view of an optical module 1D according to a fourth embodiment. The optical module 1D includes an array-type semiconductor light-receiving device 50 as a photonic device, instead of the array-type semiconductor laser device 20 of the first embodiment. The array-type semiconductor light-receiving device 50 is a device that receives light transmitted by the optical waveguide 30 and reflected by the mirror surface 12a of the element portion 12 and reads the contents of an optical signal. A lens 51 is integrally formed in the array-type semiconductor light-receiving device 50, and thus the array-type semiconductor light-receiving device 50 converges divergent light reflected by the mirror surface 12a and receives the converged light.

In a manufacturing method of the optical module 1D, the direction of the element portion 12 is manipulated by the manipulation lever 11 in the adjustment step to adjust the traveling direction of light reflected by the mirror surface 12a, and thus the light is adjusted so as to be optically coupled to the array-type semiconductor light-receiving device 50. As described above, even when an error in the attachment position of the array-type semiconductor light-receiving device 50 or the optical waveguide 30 occurs, the optical signal is optically coupled reliably to the array-type semiconductor light-receiving device 50, and thus the optical module 1D capable of reading the optical signal with reduced loss is obtained.

Also in the third and fourth embodiments, the optical axis adjustment mechanism formed in the SOI substrate 10 can employ a configuration similar to any of the configurations described in the first embodiment and the modified examples thereof, and the second embodiment.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical module comprising:
    an element portion including an optical element optically coupling first and second optical transmission paths, the element portion being disposed on a surface of a substrate;
    a manipulation lever connected at one end to the element portion and extended on the substrate surface, the manipulation lever being manipulated when moving the element portion on the substrate surface;

a bank being a projected portion raised from the substrate surface, the bank including a lever-opposing portion including a step face facing a longitudinal side face of the manipulation lever;

a support spring connected at both ends to the element portion and the bank and supporting the element portion;

a reservoir portion being a depressed portion on the substrate, the reservoir portion being surrounded in a bay shape, in a plan view, by the manipulation lever, the element portion, the support spring, and the bank from a connection point with the support spring to the lever-opposing portion; and an adhesive stored in the reservoir portion and fixing the manipulation lever to the substrate, wherein the reservoir portion includes, in the vicinity of the other end of the manipulation lever, an outflow blocking portion blocking the outflow of the adhesive before curing.

2. The optical module according to claim 1, wherein the outflow blocking portion is a portion of the bank and is a projected portion projecting from the lever-opposing portion toward the other end of the manipulation lever in a plan view.

3. The optical module according to claim 2, wherein a distance from the other end of the manipulation lever to the projected portion of the outflow blocking portion is smaller than a distance from a portion of the manipulation lever other than the other end to the lever-opposing portion.

4. The optical module according to claim 1, wherein the outflow blocking portion is formed at an opening of the bay shape and is a substrate surface having low wettability with respect to the adhesive compared to an inner region recessed into the bay shape from the opening.

5. The optical module according to claim 1, wherein the manipulation lever or the bank includes depressions and projections on a side face facing the reservoir portion.

6. The optical module according to claim 1, wherein a plurality of the element portions are arranged on the substrate, and the manipulation lever, the support spring, and the reservoir portion are provided for each of the element portions.

7. The optical module according to claim 1, wherein the substrate is a silicon substrate in which an insulating layer and a surface silicon layer are stacked in order on a surface of the substrate, and the element portion, the manipulation lever, the support spring, and the bank are integrally formed in the surface silicon layer.

8. The optical module according to claim 1, wherein the adhesive is a UV curable resin or solder.

9. A manufacturing method of the optical module according to claim 1, comprising:

a step of forming the element portion, the manipulation lever, the support spring, the bank, and the reservoir portion on the substrate;

an adhesive disposing step of disposing the adhesive in the reservoir portion;

an adjustment step of moving the manipulation lever to adjust the position or direction of the element portion after the adhesive disposing step; and a step of curing the adhesive to fix the element portion, the manipulation lever, and the support spring to the substrate after the adjustment step.

* * * * *